March 27, 1956 J. R. STERLING 2,739,416
TETHERED MODEL PLANE
Filed April 30, 1954 2 Sheets-Sheet 1
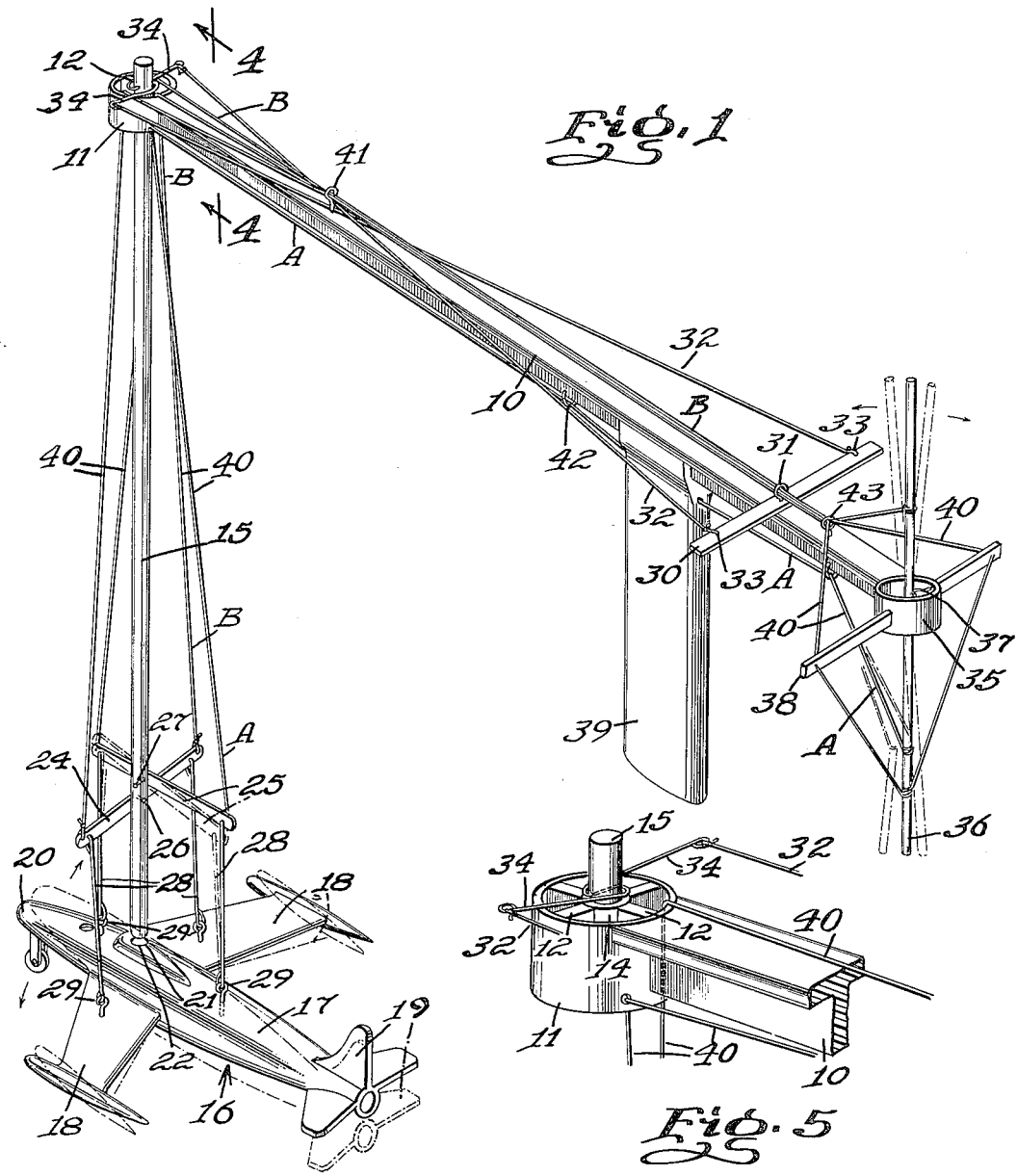
INVENTOR.
James R. Sterling
BY Victor J. Evans & co.
ATTORNEYS March 27, 1956 J. R. STERLING 2,739,416
TETHERED MODEL PLANE
Filed April 30, 1954 2 Sheets-Sheet 2
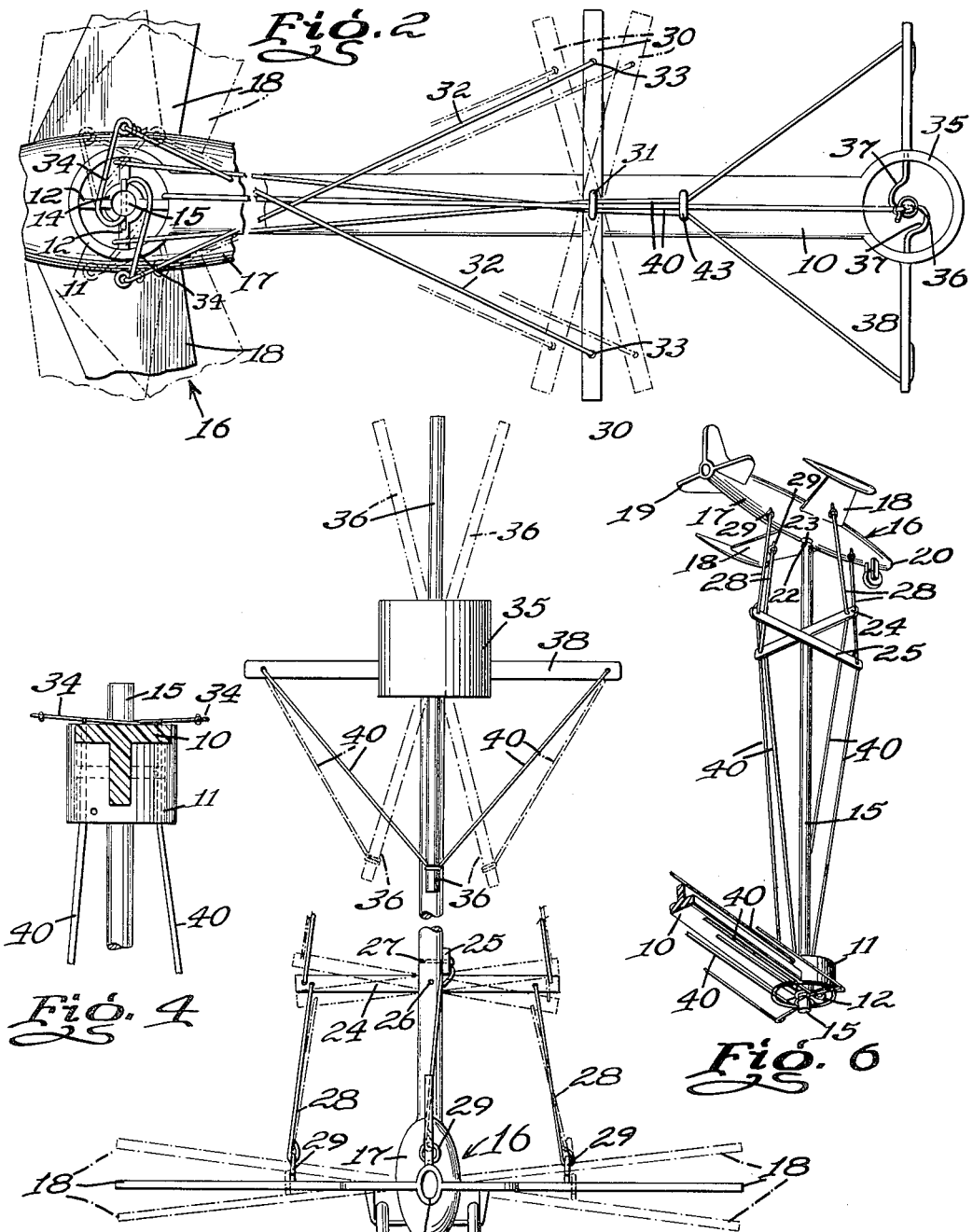
INVENTOR.
James R. Sterling
BY Victor J. Evans &co.
ATTORNEYS

United States Patent Office 2,739,416
Patented Mar. 27, 1956

2,739,416

TETHERED MODEL PLANE

James Roy Sterling, Clay Center, Kans.

Application April 30, 1954, Serial No. 426,705

2 Claims. (Cl. 46—77)

This invention relates to a toy, and more particularly to an educational toy for simulating the flight of an airplane.

The object of the invention is to provide an educational toy which can be manually operated to cause a model airplane to simulate all the movements of a real airplane to thereby provide amusement and recreation as well as instruction.

Another object of the invention is to provide a movable model airplane which will assume many different positions such as banking, climbing or diving or turning whereby the airplane can be moved to simulate the realistic flight of an airplane.

A further object of the invention is to provide an educational toy which is extremely simple and inexpensive to manufacture.

Other objects and advantages will be apparent during the course of the following description.

In the accompanying drawings, forming a part of this application, and in which like numerals are used to designate like parts through the same:

Figure 1 is a perspective view of the educational toy, constructed according to the present invention.

Figure 2 is a fragmentary top plan view of the toy.

Figure 3 is a front elevational view of the toy.

Figure 4 is a sectional view taken on the line 4—4 of Figure 1.

Figure 5 is a fragmentary perspective view showing a portion of the toy.

Figure 6 is a perspective view showing the model airplane supported above the beam instead of below the beam.

Referring in detail to the drawings, the numeral 10 designates an elongated beam which may have a T-shape in cross section, Figure 5, and secured to the front end of the beam 10 is a cylindrical collar 11. Extending inwardly from the collar 11 and secured thereto are a plurality of radially extending ribs 12. Arranged concentrically within the collar 11 is a cylindrical sleeve 14 which is secured to the inner ends of the ribs 12. A cylindrical rod 15 is rotatably mounted in the sleeve 14.

There is further provided a model airplane which is indicated generally by the numeral 16. The airplane 16 includes a body portion 17, wings 18, a tail 19, and a nose 20. A socket 21 is formed on one side of the airplane 16, and the socket 21 pivotally receives therein a ball 22 which is mounted on an end of the rod 15. A similar socket 23 is arranged on the other side of the airplane, Figure 6, whereby the airplane 16 can be supported above or below the rod 15.

Pivotally connected to the rod 15 and arranged in crisscross relation with respect to each other is a pair of bars 24 and 25. The bar 24 is pivotally connected to the rod 15 by means of a pin 26, and the bar 25 may be pivotally connected to the rod 15 by means of a pin 27, Figure 1. Suitable wire members 28 each have an end connected to the ends of the bars 24 and 25, and the other ends of the wire members 28 are connected to eyelets 29 which are secured to the airplane 16.

Pivotally connected to the beam 10 adjacent its rear end, is a rudder bar 30, there being an eyebolt 31 for pivotally connecting the rudder bar 30 to the beam 10. Each end of the rudder 30 is provided with an aperture 33, and a pair of flexible lines or cables 32 are arranged in engagement with the apertures 33 and are connected to the rudder bar 30. The front ends of the lines 32 are secured to spring members 34 which are connected to the rod 15. Thus, by manually pivoting the rudder bar 30 about the bolt 31, the lines 32 will cause the rod 15 to be rotated whereby the airplane 16 can be made to turn in any desired direction to thereby simulate the turning movement of an airplane.

Secured to the rear end of the beam 10 is a ring member 35. Movably mounted in the ring member 35 is a control stick 36, the control stick 36 being supported by a pair of spring members 37. Projecting outwardly from the ring member 35 and secured thereto is a pair of aligned arms 38. Spaced forwardly of the ring member 35 and secured to the beam 10 is a hand grip 39.

Connected to the ends of each of the bars 24 and 25 are flexible cables or cords 40, and the cables 40 extend through portions of the collar 11 and these cables 40 also extend through guide members 41, 42, and 43 which are secured to the beam 10, Figure 1. The rear ends of the cords 40 are connected to the control stick 36.

In use, the toy of the present invention is gripped manually by means of the hand grip 39. Then, by moving the rudder bar 30 with the finger or fingers, the airplane 16 can be caused to make a left or right hand turn due to the provision of the cables 32 extending between the rudder bar 30 and the spring members 34 which are connected to the rotatable rod 15. Also, by manually moving the control stick 36 with the fingers, the airplane 16 can be made to dive or climb. Similarly, by simultaneously manually actuating the rudder bar 30 and the control stick 36 the model airplane 16 can be made to execute banks or the like. Since there is the socket on both the bottom and top of the airplane, the ball on the end of the rod 15 will insure or provide a universal joint between the rod 15 and the airplane whereby the airplane will be able to execute the various movements in the same manner as a real airplane. The airplane 16 can be arranged below the beam 10 as shown in Figure 1, or else the airplane 16 can be positioned above the beam 10 as shown in Figure 6. By moving the control stick 36, the cables 40 will cause pivotal movement of the bars 24 and 25 whereby the front and rear of the airplane 16 can be selectively elevated or lowered, since the bars 24 and 25 are connected to the airplane through the medium of the wire members 28.

The present invention is an educational toy whereby suitable models of flying machines such as the airplane 16 can be caused to go through all the actions or motions of a real flying machine. The device is controlled by one hand holding the grip 39 and with the fingers actuating the control stick 36 and rudder bar 30. In actual practice both hands may be used since one hand can be used to actuate the control stick 36 and rudder bar 30 while the other hand can be used to grip the member 39. By moving the control stick 36, the airplane 16 will assume a diving or climbing angle and the stick 36 can be revolved about a vertical axis so as to cause the model airplane to bank right or left. By moving the rudder bar 30, the plane will turn to the right or left. By moving the entire device at the same time that the control stick and rudder are actuated, the airplane will appear to be headed forward so that there will be a realistic illusion of flying. The model can be used to actually simulate and fly and land in a regular traffic pattern. Any number of different types of flying could be simulated and different models of flying machines can be utilized.

I claim:

1. An educational toy comprising an elongated beam, a hand grip spaced from the rear end of said beam and secured to said beam, a collar secured to the front of said beam, a plurality of ribs extending inwardly from said collar, a sleeve arranged concentrically within said collar and secured to said ribs, a rod having one end rotatably mounted in said sleeve, a ball mounted on the other end of said rod, an airplane having a socket pivotally receiving said ball, a pair of bars arranged in crisscross relation with respect to each other and pivotally connected to said rod, wire members connecting said bars to said airplane, a pair of spring members connected to said rod, a rudder bar pivotally connected to said beam and arranged adjacent the rear end thereof, a pair of flexible cables arranged in crisscross relation with respect to each other and each having an end connected to said spring members and their other ends connected to said rudder bar, a ring member secured to the rear of said beam, a vertically disposed control stick movably mounted in said ring member, and flexible cables connecting said control stick to said bars.

2. An educational toy comprising an elongated beam, a hand grip secured to said beam, a collar secured to said beam, a plurality of ribs extending from said collar, a sleeve arranged within said collar and secured to said ribs, a rod rotatably mounted in said sleeve, a ball mounted on said rod, an airplane having a socket pivotally receiving said ball, a pair of bars arranged in crisscross relation with respect to each other and pivotally connected to said rod, wire members connecting said bars to said airplane, a pair of spring members connected to said rod, a rudder bar pivotally connected to said beam and arranged adjacent the rear end thereof, a pair of flexible cables arranged in crisscross relation with respect to each other and each having an end connected to said spring members and their other ends connected to said rudder bar, a ring member secured to said beam, a control stick movably mounted in said ring member, and flexible cables connecting said control stick to said bars.

References Cited in the file of this patent

UNITED STATES PATENTS

| 1,937,241 | Pardue et al. | Nov. 28, 1933 |
| 2,061,953 | Sampson | Nov. 24, 1936 |
| 2,305,207 | Tigerman | Dec. 15, 1942 |
| 2,559,049 | St. Clair | July 3, 1951 |

FOREIGN PATENTS

| 102,244 | Sweden | Aug. 5, 1941 |